(12) United States Patent
Ko et al.

(10) Patent No.: US 10,627,865 B2
(45) Date of Patent: Apr. 21, 2020

(54) FLEXIBLE DISPLAY DEVICE INCLUDING TOUCH SENSOR

(71) Applicant: Samsung Display Co., Ltd., Yongin-si (KR)

(72) Inventors: Jun-Young Ko, Cheonan-si (KR); Ki Nam Kim, Seoul (KR); Kwan Young Han, Seongnam-si (KR); Yong Youl Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 170 days.

(21) Appl. No.: 15/647,267

(22) Filed: Jul. 12, 2017

(65) Prior Publication Data

US 2017/0315590 A1    Nov. 2, 2017

Related U.S. Application Data

(63) Continuation of application No. 14/482,879, filed on Sep. 10, 2014, now Pat. No. 9,720,449.

(30) Foreign Application Priority Data

Dec. 2, 2013    (KR) .......................... 10-2013-0148436

(51) Int. Cl.
*G06F 1/16* (2006.01)
*G06F 3/041* (2006.01)

(52) U.S. Cl.
CPC .......... *G06F 1/1652* (2013.01); *G06F 1/1643* (2013.01); *G06F 3/041* (2013.01);
(Continued)

(58) Field of Classification Search
CPC ....... G06F 1/1652; G06F 1/1643; G06F 3/041
See application file for complete search history.

(56) References Cited

U.S. PATENT DOCUMENTS 6,373,544 B1 *   4/2002   Hirabayashi ...... G02F 1/136277
                                                      257/E27.111
6,819,316 B2    11/2004   Schulz et al.
(Continued)

FOREIGN PATENT DOCUMENTS

| CN | 101661949 | 3/2010 |
|---|---|---|
| CN | 102043533 | 5/2011 |

(Continued)

OTHER PUBLICATIONS

Non-Final Office Action dated Oct. 2, 2015, issued in U.S. Appl. No. 14/482,879.
(Continued)

*Primary Examiner* — Ariel A Balaoing
(74) *Attorney, Agent, or Firm* — H.C. Park & Associates, PLC

(57) ABSTRACT

A flexible display device including a touch sensor is disclosed. In one aspect, the display device includes a flexible substrate, a light emission layer formed over the flexible substrate, and an encapsulation layer formed over the light emission layer and comprising a plurality of encapsulating thin films and a touch detecting layer configured to detect a touch input. The encapsulating thin films include at least one inorganic film and at least one organic film and the touch detecting layer is interposed between a selected one of the at least one inorganic film and a selected one of the at least one organic film that are adjacent to each other.

12 Claims, 16 Drawing Sheets

(52) U.S. Cl.
CPC .............. *G06F 2203/04102* (2013.01); *G06F 2203/04103* (2013.01)

(56) References Cited

U.S. PATENT DOCUMENTS

| | | |
|---|---|---|
| 6,879,319 B2 | 4/2005 | Cok |
| 7,324,093 B1 | 1/2008 | Gettemy et al. |
| 8,730,191 B2 | 5/2014 | Kim et al. |
| 8,830,202 B2 | 9/2014 | Chen |
| 2005/0259049 A1 | 11/2005 | Chen |
| 2008/0211395 A1 | 9/2008 | Koshihara et al. |
| 2010/0007616 A1 | 1/2010 | Jang |
| 2010/0052521 A1 | 3/2010 | Kim et al. |
| 2010/0141605 A1 | 6/2010 | Kang et al. |
| 2010/0265207 A1 | 10/2010 | Chen |
| 2010/0315353 A1 | 12/2010 | Huang et al. |
| 2011/0007030 A1* | 1/2011 | Mo .............. G06F 3/044 345/174 |
| 2014/0002378 A1* | 1/2014 | Kim .............. G06F 3/041 345/173 |
| 2014/0098304 A1* | 4/2014 | Kim .............. G06F 3/044 349/12 |
| 2014/0174902 A1* | 6/2014 | Yang .............. G06F 3/044 200/600 |
| 2015/0060256 A1* | 3/2015 | Kim .............. G06F 3/044 200/600 |
| 2015/0268761 A1 | 9/2015 | Yang |
| 2015/0324027 A1* | 11/2015 | Heo .............. G06F 3/041 345/173 |

FOREIGN PATENT DOCUMENTS

| | | |
|---|---|---|
| CN | 102455820 | 5/2012 |
| CN | 103186306 | 7/2013 |
| EP | 2148264 | 1/2010 |
| JP | 2008-216543 | 9/2008 |
| KR | 10-0884420 | 2/2009 |
| KR | 10-1065318 | 9/2011 |
| KR | 10-1073285 | 10/2011 |
| KR | 10-1084169 | 11/2011 |
| KR | 10-1097344 | 12/2011 |
| KR | 10-2012-0062178 | 6/2012 |
| KR | 10-2013-0063971 | 6/2013 |
| KR | 10-2014-0013483 | 2/2014 |
| KR | 10-2014-0016070 | 2/2014 |
| KR | 10-2014-0016071 | 2/2014 |
| KR | 10-2014-0019146 | 2/2014 |
| KR | 10-2014-0027695 | 3/2014 |
| KR | 10-2014-0044651 | 4/2014 |
| KR | 10-2014-0054756 | 5/2014 |
| KR | 10-2014-0054761 | 5/2014 |
| KR | 10-2014-0062269 | 5/2014 |
| TW | 201039218 | 11/2010 |

OTHER PUBLICATIONS

Final Office Action dated Mar. 4, 2016, issued in U.S. Appl. No. 14/482,879.

Non-Final Office Action dated May 20, 2016, issued in U.S. Appl. No. 14/482,879.

Final Office Action dated Dec. 6, 2016, issued in U.S. Appl. No. 14/482,879.

* cited by examiner (a)

(b)

FLEXIBLE DISPLAY DEVICE INCLUDING TOUCH SENSOR

CROSS-REFERENCE TO RELATED APPLICATIONS

This application is a continuation of U.S. patent application Ser. No. 14/482,879, filed on Sep. 10, 2014, and claims priority to and the benefit of Korean Patent Application No. 10-2013-0148436 filed in the Korean Intellectual Property Office on Dec. 2, 2013, the entire contents of which are incorporated herein by reference.

BACKGROUND

1. Field

The described technology generally relates to a flexible display device including a touch sensor.

2. Description of the Related Technology

Display devices, such as liquid crystal displays (LCDs), organic light-emitting diode (OLED) displays, and electrophoretic displays (EPDs), include a field generating electrode and an electro-optical active layer. For example, OLED displays include an organic emission layer which functions as the electro-optical active layer. The field generating electrode is connected to a switching element, such as a thin film transistor (TFT), to receive a data signal. The electro-optical active layer displays an image by converting the data signal to an optical signal.

When a heavy and fragile glass substrate is used in a display panel of the display device, there is a limit to the portability and screen size thereof. Recently, flexible display devices using light plastic substrates as the substrate of a display panel have been developed since these substrates can be light, strong, and flexible.

SUMMARY OF CERTAIN INVENTIVE ASPECTS

One inventive aspect is a simplified manufacturing process of a flexible display device including a touch sensor which can reduce the associated costs.

Another aspect is a flexible display device including a touch sensor having a decreased thickness and improved optical characteristics, and reduced defects in the touch sensor, and improved durability when the flexible display device is bent so as to prevent impurities, such as moisture, from permeating into the touch sensor.

Another aspect is a display device including a flexible substrate, an emission member positioned on the flexible substrate, an encapsulation layer positioned on the emission member and including a plurality of encapsulating thin films, and a touch detecting layer included inside the encapsulation layer and including a touch sensor, in which the encapsulating thin films include at least one inorganic film and at least one organic film, and the touch detecting layer is positioned between the inorganic film and the organic film which are adjacent to each other.

Another aspect is a display device including a flexible substrate including a first film, an emission member positioned on the flexible substrate, an encapsulation layer positioned on the emission member, and a touch detecting layer formed on an upper surface or a lower surface of the first film and including a touch sensor.

At least one first encapsulating thin film positioned on the touch detecting layer among the plurality of encapsulating thin films may expose a pad portion of the touch detecting layer.

The touch sensor may include a plurality of touch electrodes positioned at a same layer.

The display device may further include touch wires connected to the touch electrodes and end portions of the touch wires may form the pad portion.

The touch electrodes may include a plurality of first touch electrodes and a plurality of second touch electrodes, which are separated from each other, do not overlap each other, and are alternately arranged, the first touch electrodes arranged in a first direction may be connected to each other by a plurality of first connection parts, and the second touch electrodes arranged in a second direction different from the first direction may be connected to each other by a plurality of second connection parts.

The display device may further include an insulating layer positioned between the first connection part and the second connection part and configured to insulate the first connection part from the second connection part.

The first connection part may be positioned at a same layer as that of the first touch electrode and integrated with the first touch electrode and the second connection part may be positioned on a different layer from that of the second touch electrode.

The second connection part may be positioned on the insulating layer.

The touch electrode may include at least one of a dummy pattern, a protruding pattern, or a static electricity inducing pattern for protection from static electricity.

At least one inorganic film and at least one organic film, which are alternately stacked, may be positioned on the touch detecting layer.

The second connection part may include a low resistance opaque conductive material.

The display device may further include a second film positioned between the first film and the emission member, in which the second film may include polyimide (PI).

Another aspect is flexible display device including a flexible substrate, a light emission layer formed over the flexible substrate, and an encapsulation layer formed over the light emission layer and including a plurality of encapsulating thin films and a touch detecting layer configured to detect a touch input, wherein the encapsulating thin films include at least one inorganic film and at least one organic film that are alternately stacked and wherein the touch detecting layer is interposed between a selected one of the at least one inorganic film and a selected one of the at least one organic film that are adjacent to each other.

The touch detecting layer includes a pad portion and wherein at least one of the encapsulating thin films formed over the touch detecting layer exposes the pad portion. The touch detecting layer includes a plurality of touch electrodes formed in the same layer. The display device further includes a plurality of touch wires electrically connected to the touch electrodes, wherein the pad portion includes end portions of the touch wires. The touch electrodes include a plurality of first touch electrodes and a plurality of second touch electrodes that are spaced apart from each other, do not overlap each other, and are alternately arranged, wherein the first touch electrodes are arranged in a first direction and connected to each other via a plurality of first connection portions and wherein the second touch electrodes are arranged in a second direction crossing the first direction and connected to each other via a plurality of second connection portions.

The display device further includes an insulating layer interposed between the first and second connection portions. The first connection portions are formed in the same layer as the first touch electrodes and are integrated with the first touch electrodes, wherein the second connection portions are formed in a different layer from the second touch electrodes. The second connection portions are formed over the insulating layer. Each of the touch electrodes includes at least one of a dummy pattern, a protruding pattern, or a charge collection pattern. One or more of the at least one inorganic film and one of more of the at least one organic film are formed over the touch detecting layer. The touch electrodes include a plurality of first touch electrodes and a plurality of second touch electrodes that are spaced apart from each other, do not overlap each other, and are alternately arranged, wherein the first touch electrodes are arranged in a first direction and connected to each other via a plurality of first connection portions and wherein the second touch electrodes are arranged in a second direction crossing the first direction and connected to each other via a plurality of second connection portions.

Another aspect is a flexible display device including a flexible substrate including a first film, a light emission layer formed over the flexible substrate, an encapsulation layer formed over the light emission layer, and a touch detecting layer formed on an upper surface or a lower surface of the first film.

The touch detecting layer includes a plurality of touch electrodes formed in the same layer. The touch electrodes include a plurality of first touch electrodes and a plurality of second touch electrodes that are spaced apart from each other, do not overlap each other, and are alternately arranged, wherein the first touch electrodes are arranged in a first direction and connected to each other via a plurality of first connection portions and wherein the second touch electrodes are arranged in a second direction crossing from the first direction and connected to each other via a plurality of second connection portions. The display device further includes an insulating layer interposed between the first connection portions and the second connection portions. The first connection portions are formed in the same layer as the first touch electrodes and are integrated with the first touch electrodes and the second connection portions are formed in a different layer from the second touch electrodes. The second connection portions are formed over the insulating layer. The second connection portions are formed at least partially of a low resistance opaque conductive material. The touch electrodes include at least one of a dummy pattern, a protruding pattern, or a charge collection pattern. The display device further includes a second film interposed between the first film and the light emission layer, wherein the second film is formed at least partially of polyimide (PI).

Another aspect is a display device including a flexible substrate, a plurality of pixels formed over the substrate, an encapsulation layer formed over the pixels and including a plurality of alternately arranged organic and inorganic layers, and a touch detecting layer configured to detect a touch input, wherein at least one of the organic or inorganic layers are interposed between the touch detecting layer and the pixels.

The touch detecting layer includes a plurality of first touch electrodes and a plurality of second touch electrodes that are spaced apart from each other, wherein the first touch electrodes are arranged in a first direction and electrically connect to each other via a plurality of first connection portions and wherein the second touch electrodes are arranged in a second direction crossing the first direction and electrically connected to each other via a plurality of second connection portions. The touch detecting layer further includes a plurality of charge collection patterns formed between neighboring ones of the first and second touch electrodes and each of the charge collection patterns is electrically connected to one of the neighboring first and second touch electrodes and electrically insulated from the other touch electrode According to at least one embodiment, it is possible to simplify the manufacturing process of the flexible display device including the touch sensor and decrease the cost thereof.

According to at least one embodiment, it is possible to decrease the thickness of the flexible display device including the touch sensor and improve the optical characteristics.

According to at least one embodiment, it is possible to decrease defects of the touch sensor and improve durability when the flexible display device is bent by preventing impurities, such as moisture, from penetrating to the touch sensor.

DETAILED DESCRIPTION OF CERTAIN INVENTIVE EMBODIMENTS

Figure 1:
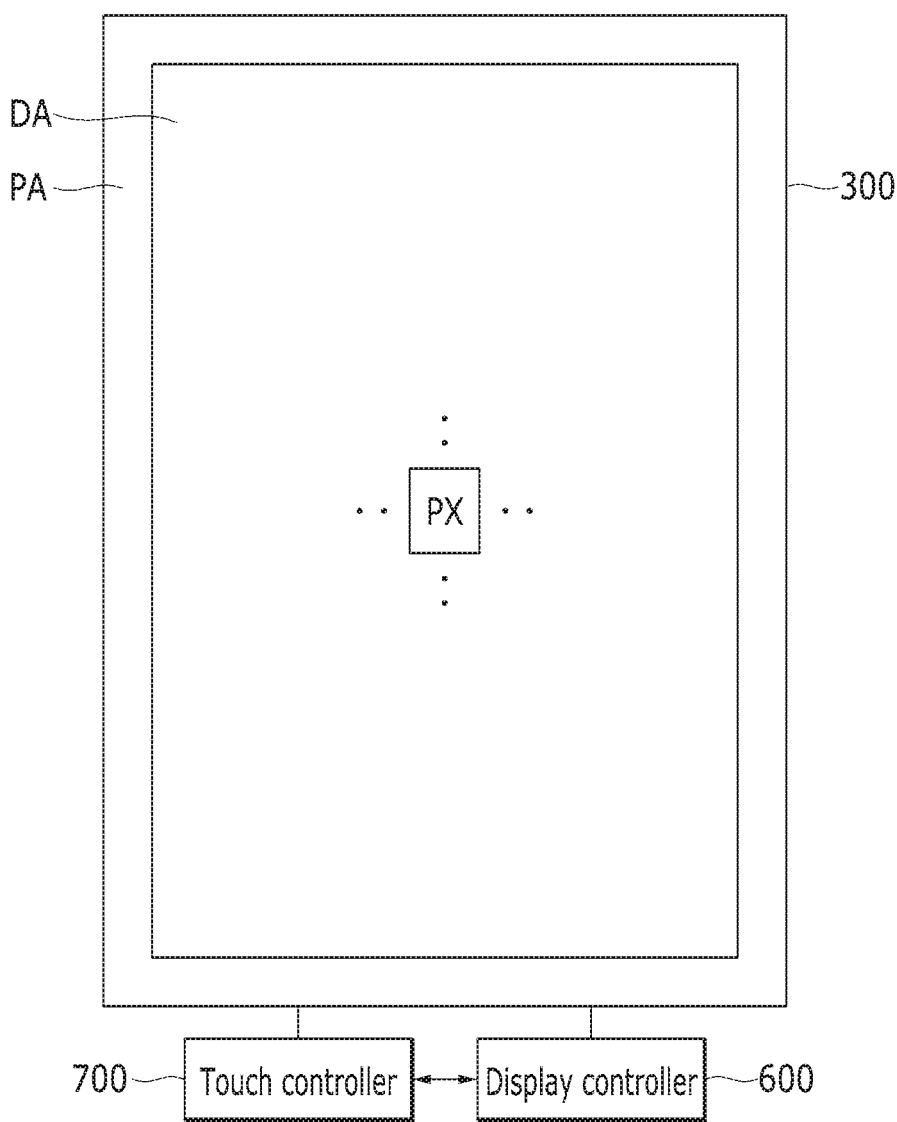
FIG. 1 is a block diagram of a flexible display device according to an exemplary embodiment.

Display devices providing for touch input are in wide use today across a range of portable electronic devices. The touch input is translated into touch information, such as whether an object approaches or touches the screen and the position of the touch input, by measuring changes in the physical properties of touch sensors near the screen. The touch sensors can measure changes in pressure applied to the screen, stored charge, received light, or the like when a user approaches or touches a screen with a finger or touch pen. The display device can receive different image signals based on the touch information and display images based on the received image signals.

Touch input can be implemented by using a touch sensor. Touch sensors can be classified based on the physical properties measured, such as resistance, capacitance, or electro-magnetic (EM) radiation.

For example, resistive touch sensors include two electrodes which face each other and are spaced apart from each other and can be brought into contact with each other by pressure. When the two electrodes contact each other, the touch sensor recognizes a touch position, by measuring a change in voltage based on change in resistance at the position of the contact.

Capacitive touch sensors include detection capacitors formed of a plurality of detecting electrodes capable of transmitting a detection signal. These sensors measure whether a touch input is generated and the position by measuring a change in the capacitance or stored change in the detection capacitor generated when a conductor, such as a finger, approaches the touch sensor. These sensors includes a plurality of touch electrodes formed in a touch detecting region and signal transmitting wires connected to the touch electrodes. The signal transmitting wires transmit a touch input signal to the touch electrodes. They also receive a detection output signal from the touch electrode generated based on the touch input and transmit the output signal to a detection signal controller.

Touch sensors included in flexible display devices are typically formed on a separate touch panel and attached to the flexible display device (i.e. add-on cell type sensors). The additional steps for adding a touch sensor decreases the manufacturing yield and increases the manufacturing costs. Further, an adhesive layer is formed between the touch panel and the display device, or on the touch panel, and as a result, the thickness of the display device increases. This can also decrease transmittance and increase reflectance of the display device. The wires connected to the touch sensor are vulnerable to corrosion when formed on an external side of the display. When the flexible display is bent the durability of the touch sensor and connecting electronics can be negatively impacted from the stress, resulting in the above described defects.

The described technology will be described more fully hereinafter with reference to the accompanying drawings, in which exemplary embodiments are shown. As those skilled in the art would realize, the embodiments may be modified in various different ways, all without departing from the spirit or scope of the described technology.

In the drawings, the thicknesses of layers, films, panels, regions, etc., may be exaggerated for the sake of clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a display device and a driving method thereof according to an exemplary embodiment will be described in detail with reference to the accompanying drawings.

First, a flexible display device including a touch sensor will be described with reference to FIGS. 1 to 4.

Referring to FIG. 1, the flexible display device includes a display panel 300, and a display controller 600 and a touch controller 700 connected to the display panel 300.

The display panel 300 displays images and detects touch input. The display panel 300 includes a display area DA displaying an image and a peripheral area PA surrounding the display area DA when viewed in a plane view.

A portion of or the entire area of the display panel 300 is a touch active area TA capable of detecting touch input. The touch active area TA is an area capable of detecting touch input when an object approaches or touches the display panel 300. Here, the touch input includes when an external object approaches the display panel 300 or hovers over the display panel 300, in addition to when an external object, such as a finger of a user, is in direct contact with the display panel 300.

Figure 2:
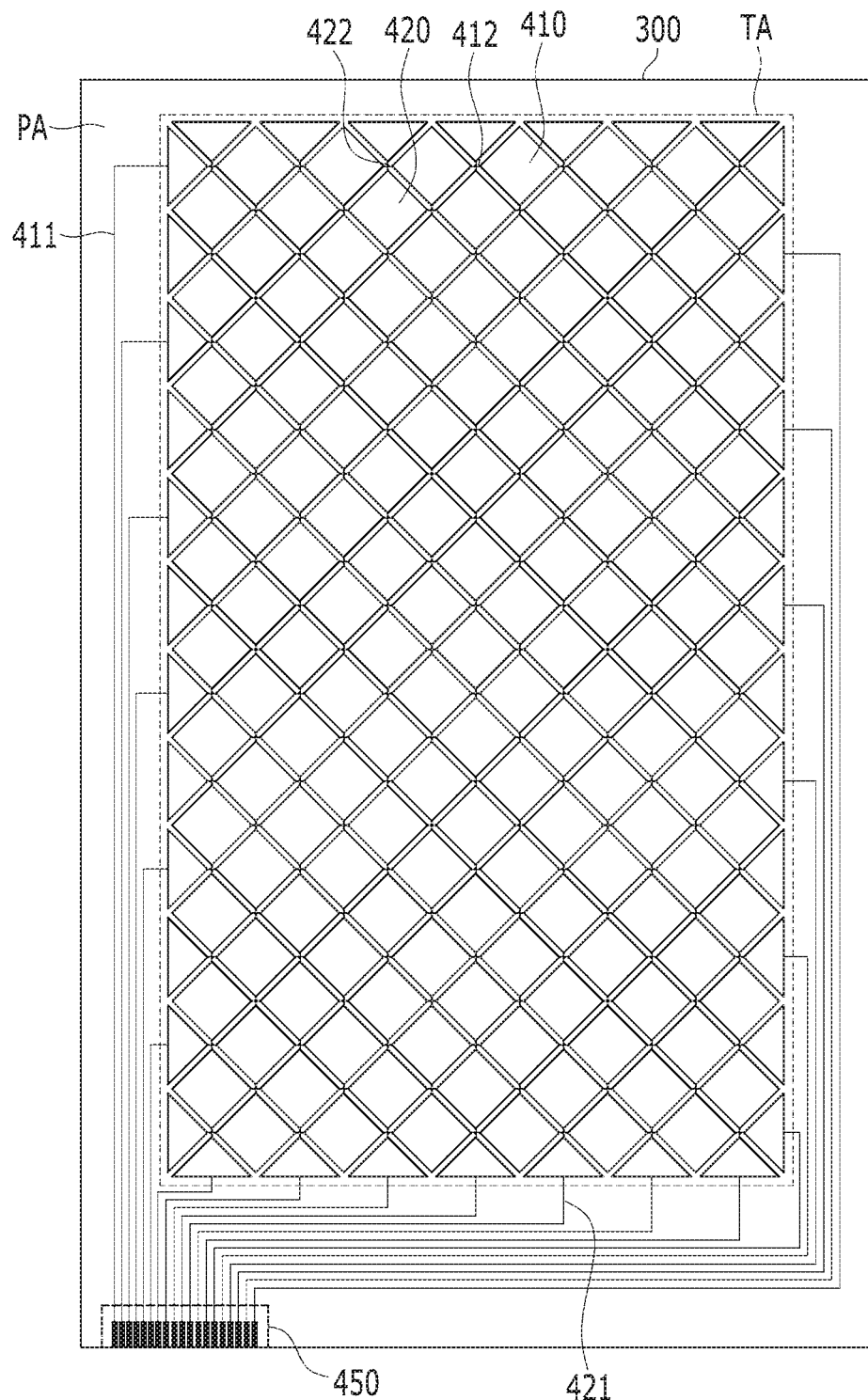
FIG. 2 is a top plan view illustrating a touch sensor of the flexible display device according to an exemplary embodiment.

FIG. 2 illustrates an example in which substantially the entire display area DA is the touch active area TA, but the described technology is not limited thereto. A portion of the peripheral area PA can be included in the touch active area TA or only a portion of the display area DA may serve as the touch active area TA.

Referring to FIG. 1, a plurality of pixels PX and a plurality of display signal lines (not illustrated) connected to the pixels PX are formed in the display area DA. The display signal lines apply driving signals to the pixels PX.

The display signal lines include a plurality of scan lines (not illustrated) applying scan signals and a plurality of data lines (not illustrated) applying data signals. The scan lines and the data lines extended in different directions which cross each other. The display signal lines extend to the peripheral area PA to form a pad portion (not illustrated).

In the FIG. 1 embodiment, the pixels PX are arranged in a matrix, but the described technology is not limited thereto. Each pixel PX includes a switching element (not illustrated) connected with to gate line and the data line and a pixel electrode (not illustrated) connected to the switching element. The switching element may be a three-terminal element, such as a thin film transistor (TFT), integrated on the display panel 300. The switching element is turned on or turned off according to the gate signal received from the gate line to selectively transmit the data signal received from the data line to the pixel electrode. The pixel PX further includes an opposite electrode (not illustrated) opposing the pixel electrode. When the display device is an organic light-emitting diode (OLED) display, an emission layer is formed between the pixel electrode and the opposite electrode to form am OLED. The opposite electrode receives a common voltage.

In order to implement a color display, each pixel PX displays one of the primary colors and a desired color is recognized by a sum of the primary colors. Examples of the primary color may include three primary colors, such as red, green, and blue, or four primary colors. Each pixel PX may further include a color filter positioned corresponding to each pixel electrode and filtering light to emit one of the primary colors. The emission layer included in the OLED may also emit colored light.

A touch sensor is formed in the touch active area TA. Touch sensors can detects touch input by various methods. For example, the touch sensors can be classified based on the physical property measured, such as resistance, capacitance, electro-magnetic (EM) radiation, and optical measurements.

In the embodiment of FIG. 2, a capacitive touch sensor will be described as an embodiment.

Referring to FIG. 2, the touch sensor includes a plurality of touch electrodes and the touch electrodes include a plurality of first touch electrodes 410 and a plurality of second touch electrodes 420. The first and second touch electrodes 410 and 420 are separated from each other.

Referring to FIG. 2, the first and second touch electrodes 410 and 420 are alternately arranged and are formed in the touch active area TA so as not to overlap each other. The first and second touch electrodes 410 and 420 are formed in a plurality of rows and columns.

The first and second touch electrodes 410 and 420 are formed in the same layer.

Each of the first and second touch electrodes 410 and 420 can have a substantially quadrangular shape, but the described technology is not limited thereto, and the electrodes may have various forms. In some embodiments, the first and second electrodes 410 and 420 have a protrusion in order to improve sensitivity of the touch sensor.

The first touch electrodes 410 arranged in the same row or column are connected to or separated from each other inside or outside the touch active area TA. Similarly, the second touch electrodes 420 arranged in the same column or row are connected to or separated from each other inside or outside the touch active area TA. According to some embodiments, the first touch electrodes 410 arranged in the same row are electrically connected to each other inside the touch active area TA as illustrated in FIG. 2 and the second touch electrodes 420 arranged in the same column are electrically connected with each other inside the touch active area TA.

More particularly, the first touch electrodes 410 positioned in each row are electrically connected to each other through first connection parts or first connection portions 412 and the second touch electrodes 420 positioned in each column are electrically connected to each other through second connection parts or second connection portions 422.

Figure 3:
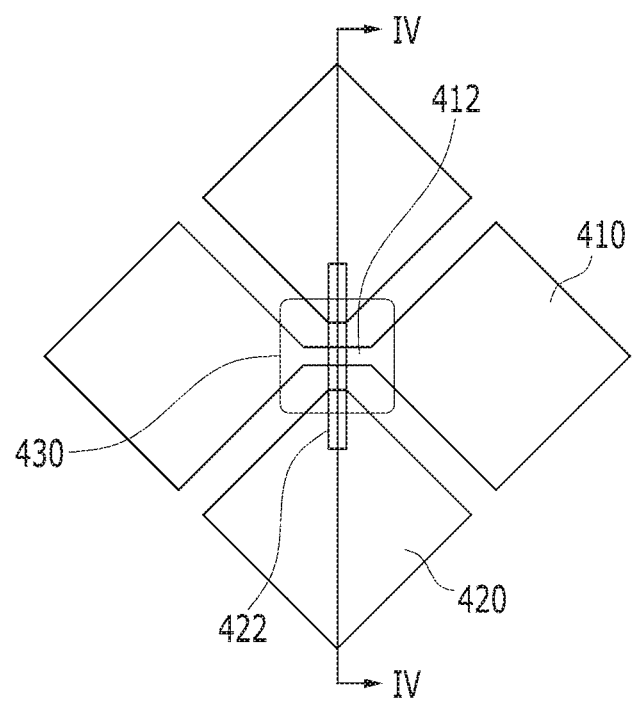
FIG. 3 is an enlarged view of a part of the touch sensor illustrated in FIG. 2.
Figure 4:
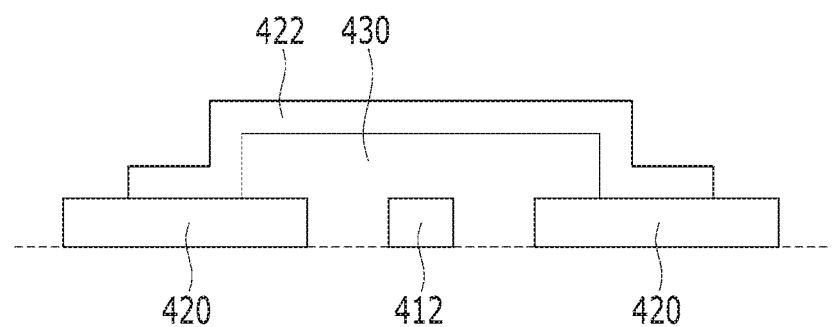
FIG. 4 is a cross-sectional view illustrating the touch sensor illustrated in FIG. 3 taken along line IV-IV.

Referring to FIGS. 3 and 4, the first connection parts 412 connecting adjacent first touch electrodes 410 is formed in the same layer as the first touch electrodes 410 and formed of the same material as the first touch electrodes 410. That is, in some embodiments, the first touch electrodes 410 and the first connection parts 412 are integrated with each other and are simultaneously patterned.

The second connection parts 422 connecting adjacent second touch electrodes 420 are formed on a different layer from the second touch electrodes 420. That is, the second touch electrodes 420 and the first connection parts 412 are separated from each other and can be separately patterned. The second touch electrodes 420 and the second connection parts 422 are electrically connected to each other through direct contact.

An insulating layer 430 is interposed between the first and second connection parts 412 and 422 to insulate the first and second connection parts 412 and 422 from each other. The insulating layers 430 are formed as a plurality of separated island-shaped insulators each formed at the intersections between the first and second connection parts 412 and 422 as illustrated in FIGS. 3 and 4. The insulating layer 430 exposes at least a portion of the second touch electrode 420 so that the second connection part 422 can be connected to the second touch electrode 420.

The edge of the insulating layer 430 may have a round shape or may have a polygonal shape.

According to other embodiments, the insulating layer 430 formed over substantially the entire touch active area TA and portions of the insulating layer 430 over the second touch electrodes 420 are removed for connection between the second touch electrodes 420 adjacent in a column direction and the second connection parts 422.

In contrast to the embodiments of FIGS. 3 and 4, a second connection part 422 connecting adjacent second touch electrodes 420 can be formed in the same layer as the first touch electrodes 410 and integrated with the first touch electrodes 410 and the first connection parts 412 connecting adjacent first touch electrodes 410 can be formed on a different layer from the first touch electrodes 410.

Referring to FIG. 2, the first touch electrodes 410 connected to each other in each row are connected to the touch controller 700 through first touch wires 411 and the second touch electrodes 420 connected to each other in each column are connected to the touch controller 700 through second touch wires 421. The first and second touch wires 411 and 421 are formed in the peripheral area PA of the display panel 300 as illustrated in FIG. 2. According to other embodiments, the first and second touch wires are formed in the touch active area TA.

End portions of the first and second touch wires 411 and 421 form a pad portion 450 in the peripheral area PA of the display panel 300.

The first and second touch electrodes 410 and 420 have a predetermined transmittance or greater such that light can pass through the display panel 300. For example, the first and second touch electrodes 410 and 420 may be formed of a transparent conductive material, such as a thin metal layer including indium tin oxide (ITO), indium zinc oxide (IZO), silver nano wire (AgNw), metal mesh, or carbon nano tube (CNT), but they not limited thereto.

The first and second touch wires 411 and 421 may include the transparent conductive material included in the first and second touch electrodes 410 and 420, or a low resistance material, such as molybdenum (Mo), silver (Ag), titanium (Ti), copper (Cu), aluminum (Al), or molybdenum/aluminum/molybdenum (Mo/Al/Mo).

The first and second touch electrodes 410 and 420, which are adjacent to each other, form a mutual sensing capacitor serving as the touch sensor. The mutual sensing capacitor receives a detection input signal through one of the first and second touch electrodes 410 and 420 and outputs a change in stored charge as a detection output signal from the other of the first and second touch electrodes 410 and 420. The charge stored in the mutual sensing capacitor is changed due to the touch input of an external object.

In contrast to the embodiments of FIGS. 2 to 4, the first and second touch electrodes 410 and 420 may be separated from each other and electrically connected to the touch controller 700 through touch wires (not illustrated). In these embodiments, each touch electrode forms a self-sensing capacitor as the touch sensor. The self-sensing capacitor receives the detection input signal and is charged to a predetermined charge amount. When an external object, such as a finger, touches the touch sensor the predetermined charged charge is changed and the self-sensing capacitor outputs a detection output signal different from the detection input signal.

Referring back to FIG. 1, the display controller 600 controls the image display operation of the display panel 300.

More particularly, the signal controller 600 receives an input image signal containing luminance information for each pixel PX and an input control signal controlling the display of the input image signal from an external source. The signal controller 600 processes the input image signal based on the input control signal to convert the processed input image signal to an output image signal. The signal controller then generates a control signal, such as a gate control signal and a data control signal. The signal controller 600 transmits the gate control signal to a gate driver (not illustrated) and transmits the data control signal and the output image signal to a data driver (not illustrated).

Although not illustrated, the data driver receives the output image signals for the pixels PX of one row according to the data control signal, selects a grayscale voltage corresponding to each of the output image signal, converts the output image signals to data voltages, and then applies the converted data voltages to corresponding data lines. The gate driver turns on the switching element connected to the gate line by applying a gate-on voltage to the gate line according to the gate control signal. Then, the data voltage applied to the data line is applied to the corresponding pixel PX through the turned-on switching element. When the data voltage is applied to the pixel PX, the pixel PX emits light with a luminance corresponding to the data voltage through various optical conversion devices, such as an OLED.

The touch controller 700 is connected to the touch sensor formed in the touch active area and controls the operation of the touch sensor. The touch controller 700 transmits the detection input signal to the touch sensor and receives and process the detection output signal. The touch controller 700 generates touch information, such as whether touch input has occurred and the corresponding touch position, by processing the detection output signal.

The driving devices, such as the data driver, the gate driver, and the display controller 600, may be directly mounted on the display panel 300 in the form of at least one integrated circuit chip, may be mounted on a flexible printed circuit film (not illustrated) to be attached onto the display panel 300 in the form of a tape carrier package (TCP), or may be mounted on a separate printed circuit board (PCB) (not illustrated). Alternatively, the driving device may be integrated with the display panel 300 together with the display signal lines, the switching element, and the like.

The touch controller 700 may also be directly mounted onto the display panel 300 in the form of at least one integrated circuit chip, may be mounted on a flexible printed circuit film to be attached onto the display panel 300 in the form of a TCP, or may be mounted on a separate PCB. The touch controller 700 may be connected to the first touch wire 411 and the second touch wire 421 through the pad portion 450 of the display panel 300.

Next, the structure of the flexible display device will be described with reference to FIGS. 5 and 6 together with the aforementioned FIGS. 1 to 4.

Figure 5:
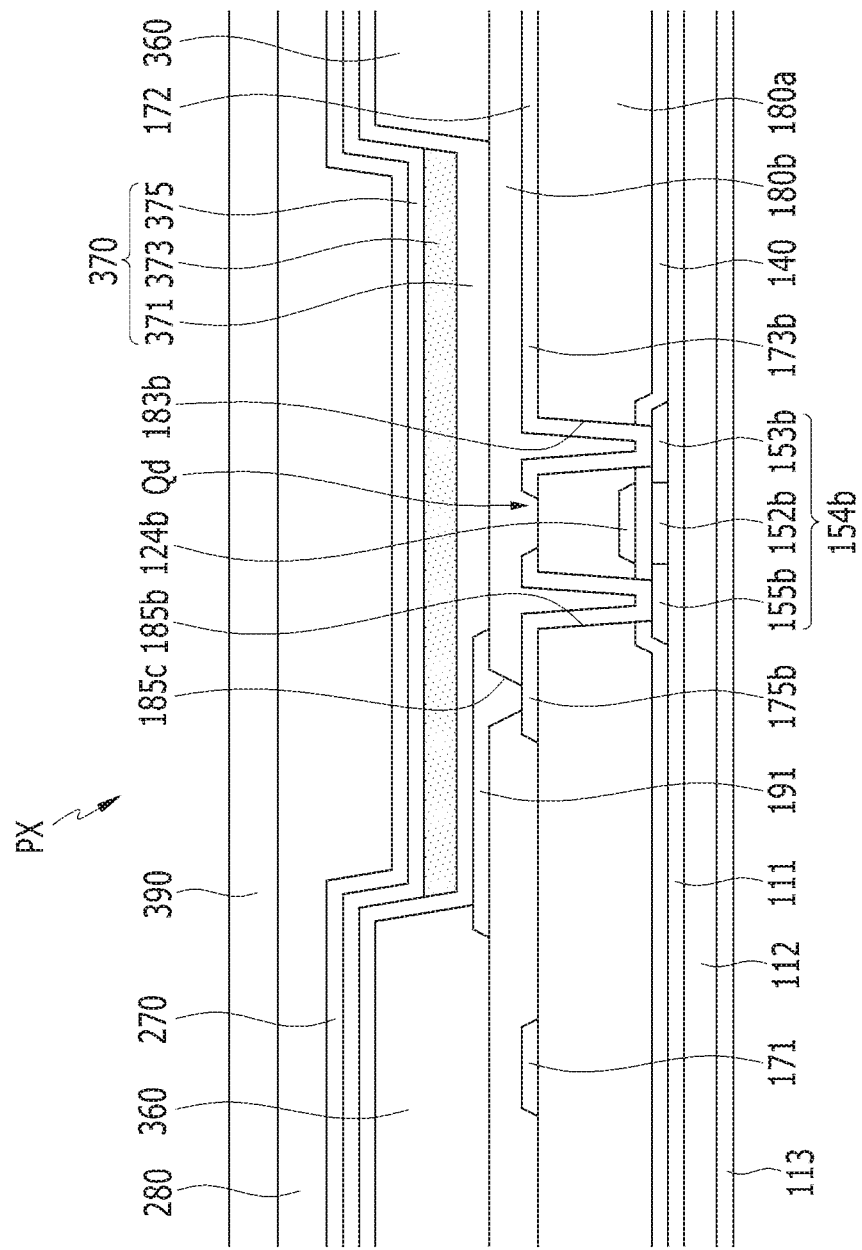
FIG. 5 is a cross-sectional view of one pixel of the flexible display device according to an exemplary embodiment.

FIG. 5 is a cross-sectional view of one pixel of the flexible display device according to an exemplary embodiment. FIG. 6 is a cross-sectional view of an encapsulation layer of the flexible display device according to an exemplary embodiment.

Referring to FIG. 5, the flexible display device includes a flexible substrate, and the flexible substrate may include various plastics, a metal thin film, ultrathin glass, or the like. According to some embodiments, the flexible substrate includes at least one plastic film. The plastic film may include, for example, polyethylene terephthalate (PET), polyethylene naphthalate (PEN), polycarbonate (PC), polyarylate (PAR), polyetherimide (PEI), polyethersulfone (PES), or polyimide (PI).

FIG. 5 illustrates an example in which the flexible substrate includes a first film 112 and a second film 113. For example, the first film 112 may include polyimide (PI) having excellent moisture proofing performance and the second film 113 may include polyethylene terephthalate (PET) as a base film. The first film 112 is formed on the second film 113. In some embodiment, the second film 113 is omitted.

A barrier layer 111 is formed on the first film 112. The barrier layer 111 prevents impurities from penetrating through the flexible substrate and permeating to an upper side of the barrier layer 111. The top surface of the barrier layer can be flat. The barrier layer 111 can include at least one of an inorganic layer or an organic layer. For example, the barrier layer 111 can include silicon nitride (SiNx), silicon oxide (SiOx), or silicon oxynitride (SiOxNy). The barrier layer 111 may be omitted in some embodiments.

A display device including a plurality of thin films is formed on the barrier layer 111. The display device includes the aforementioned various signal lines and wires and the pixels PX. The signal lines include the scan lines applying scan signals and the data lines applying data signals.

An embodiment of the display device will be described with reference to FIG. 5. A plurality of active layers 154b are formed on the barrier layer 111. The active layer 154b includes a channel region 152b, and a source region 153b and a drain region 155b formed at both sides of the channel region 152b. The source and drain regions 153b and 155b are formed by doping the active layer 154b. The active layer 154b may be formed of amorphous silicon, polysilicon, or an oxide semiconductor.

A gate insulating layer 140 formed of silicon nitride (SiNx), silicon oxide (SiOx) or the like is formed on the active layer 154.

The scan lines (not illustrated) and a plurality of gate conductors including a control electrode or gate electrode 124b are formed on the gate insulating layer 140. The gate electrode 124b substantially overlaps a portion of the active layer 154b, particularly, the channel region 152b.

A first passivation layer 180a is formed on the gate insulating layer 140 and the gate conductor. The first passivation layer 180a and the gate insulating layer 140 include a contact hole 183b through which the source region 153b of the active layer 154b is exposed and a contact hole 185b through which the drain region 155b is exposed.

A plurality of data conductors including the data lines 171, a plurality of input electrodes 173b, and a plurality of output electrodes 175b are formed on the first passivation layer 180a. The data line 171 transmits a data signal and crosses the scan line. The input electrode 173b is connected to the data line 171. The output electrode 175b may have an island shape and is separated from the data line 171. The input electrode 173b and the output electrode 175b face each other on opposing sides of the active layer 154b.

The input electrode 173b and the output electrode 175b are respectively electrically connected to the source region 153b and the drain region 155b of the active layer 154b through the contact holes 183b and 185b.

The control electrode 124b, the input electrode 173b, and the output electrode 175b form a driving thin film transistor Qd together with the active layer 154b. However, the structure of the driving thin film transistor Qd is not limited thereto and may be variously changed.

A second passivation layer 180b formed of an inorganic insulating material, such as silicon nitride or silicon oxide, is formed on the data conductor. The second passivation layer 180b has a substantially flat surface without any steps in order to improve the light emitting efficiency of a light emitting member to be formed thereon. The second passivation layer 180b has a contact hole 185c through which the output electrode 175b is exposed.

A plurality of pixel electrodes 191 are formed on the second passivation layer 180b.

The pixel electrode 191 of each pixel PX is physically and electrically connected to the output electrode 175b through the contact hole 185c in the second passivation layer 180b. The pixel electrode 191 may be formed of a transflective conductive material or a reflective conductive material.

A pixel defining layer (also referred to as a partition wall) 360 having a plurality of openings through which the pixel electrodes 191 are exposed is formed on the second passivation layer 180b. The openings in the pixel defining layer 360 through which the pixel electrodes 191 are exposed define each of the pixel regions. The pixel defining layer 360 may be omitted in some embodiments.

An emission member or light emission layer 370 is formed on the pixel defining layer 360 and the pixel electrode 191. The emission member 370 includes a first organic common layer 371, a plurality of emission layers 373, and a second organic common layer 375 which are sequentially stacked.

The first organic common layer 371 may include, for example, at least one of a hole injecting layer and a hole transport layer which are sequentially stacked. The first organic common layer 371 may be formed over substantially the entire surface of the display area in which the pixels PX are formed or may be formed only in the area of each pixel PX.

The emission layers 373 are formed on the pixel electrodes 191 of the corresponding pixels PX. The emission layer 373 may be formed of an organic material uniquely emitting light of one of the primary colors, such as red, green, or blue, or may have a structure in which a plurality of organic material layers emitting light of different colors are stacked.

The second organic common layer 375 may include, for example, at least one of an electron transport layer and an electron injecting layer which are sequentially stacked. The second organic common layer 375 may be formed over substantially the entire surface of the display area in which the pixels PX are arranged or may be formed only in the area of each pixel PX.

The first and second organic common layers 371 and 375 improve the light emission efficiency of the emission layer 373 and any one of the first and second organic common layers 371 and 375 may be omitted.

An opposite electrode 270 applying the common voltage is formed on the emission member 370. The opposite electrode 270 may include a transparent conductive material. For example, the opposite electrode 270 may be formed of a transparent conductive material, or may be formed by thinly stacking a metal, such as calcium (Ca), barium (Ba), magnesium (Mg), aluminum (Al), or silver (Ag), thereby having light transmission properties.

The pixel electrode 191, the emission member 370, and the opposite electrode 270 of each pixel PX form an OLED and one of the pixel electrode 191 and the opposite electrode 270 serves as a cathode and the other serves as an anode.

According to some embodiments, the flexible display device is a top emission type display which emits internal light from the emission member 370 in an upward direction to display an image.

An encapsulation layer 280 is formed on the opposite electrode 270. The encapsulation layer 280 prevents moisture and/or oxygen from penetrating from the environment by encapsulating the emission member 370 and the opposite electrode 270.

The encapsulation layer 280 includes a plurality of encapsulating thin films.

Figure 6:
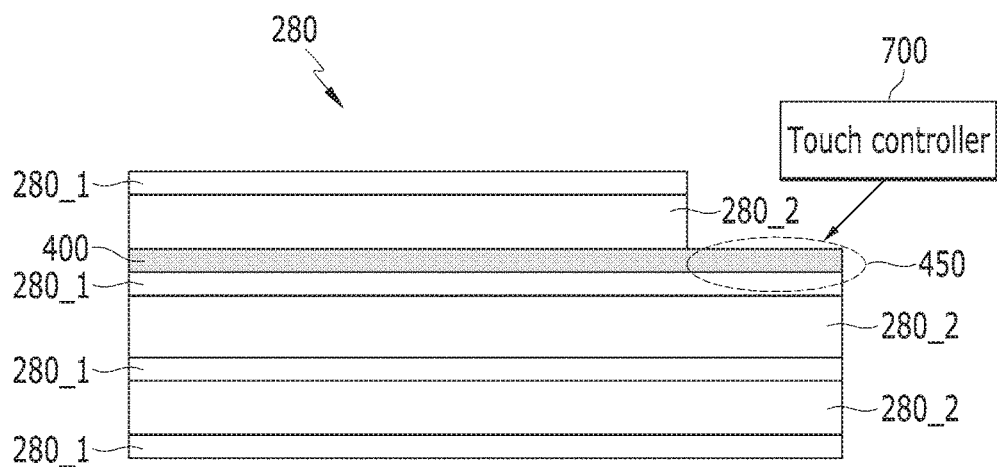
FIG. 6 is a cross-sectional view of an encapsulation layer of the flexible display device according to an exemplary embodiment.

Referring to FIG. 6, the plurality of encapsulating thin films of the encapsulation layer 280 include at least one inorganic film 280_1 and at least one organic film 280_2, and the at least one inorganic film 280_1 and the at least one organic film 280_2 may be alternately stacked. The inorganic film 280_1 includes an inorganic material, such as aluminum oxide (AlOx), silicon oxide (SiOx), or silicon nitride (SiNx). FIG. 6 illustrates an embodiment in which the inorganic film 280_1 is formed at the lowermost side and the uppermost side of the encapsulation layer 280, but the described technology is not limited thereto. The organic film 280_2 may be formed on the lowermost side or the uppermost side of the encapsulation layer 280.

The touch sensor and a touch detecting layer 400 including the touch wires 411 and 412 connected to the touch sensor are formed inside the encapsulation layer 280 according to the embodiment of FIG. 6. That is, the touch detecting layer 400 is interposed between the encapsulating thin films of the encapsulation layer 280. More particularly, the touch detecting layer 400 is interposed between the organic film 280_2 and the inorganic film 280_1 of the encapsulation layer 280 which are adjacent to each other.

FIG. 6 illustrates an embodiment in which the touch detecting layer 400 is formed directly above the inorganic film 280_1 near the upper side of the encapsulating thin films of the encapsulation layer 280, but the described technology is not limited thereto. The touch detecting layer 400 may be formed directly above the organic film 280_2 and the touch detecting layer 400 may be formed directly above another inorganic film 280_1.

When the touch detecting layer 400 is interposed between the encapsulating thin films near a lower side of the encapsulation layer 280, interference may be generated due to parasitic capacitance between the touch detecting layer 400 and the display device formed at the lower side. Accordingly, in some embodiments, the dielectric constant of the encapsulating thin films of the encapsulation layer 280, particularly, the encapsulating thin films formed under the touch detecting layer 400 are selected to be relatively low.

As described above, at least one encapsulating thin film is formed in each of an upper portion and a lower portion of the touch detecting layer 400 included in the encapsulation layer 280 so that it is possible to block moisture and/or oxygen from penetrating to the touch detecting layer 400 from the environment.

In order to protect the touch detecting layer 400, at least one inorganic film 280_1 and at least one organic film 280_2, which are alternately stacked, are formed above the touch detecting layer 400.

A portion of the encapsulating thin film formed at an upper portion of the pad portion 450 of the touch wire included in the touch detecting layer 400 is removed, so that the pad portion 450 is exposed. The touch controller 700 is electrically connected to the pad portion 450.

The touch detecting layer 400 is formed by sequentially stacking the encapsulating thin films and forming the touch electrodes and the touch wires by stacking a conductive material for the touch electrodes and the touch wires on the encapsulating thin films by a method, such as sputtering, and patterning and printing the conductive material. Next, the remaining encapsulating thin films are stacked on the touch detecting layer 400 and the encapsulating thin films on the touch detecting layer 400 are patterned, so that a region of the upper portion of the pad portion 450, in which the encapsulating thin film is removed, can be formed. Alternatively, the encapsulating thin film can be stacked only on a region excluding the pad portion 450 by using a mask when the remaining encapsulating thin films are stacked on the touch detecting layer 400.

A detailed structure of the touch sensor included in the touch detecting layer 400 is the same as described above, and thus, a detailed description thereof will be omitted.

As described above, the touch detecting layer 400 including the touch sensor is formed together during the process of forming the encapsulation layer 280, so that it is not necessary to separately manufacture and attach the touch panel. Accordingly, it is possible to simplify the manufacturing process of the flexible display device including the touch sensor and thereby decrease the manufacturing cost. Further, it is not necessary to attach a separate touch panel onto the display panel on which an image is displayed, so that it is possible to decrease the thickness of the flexible display device including the touch sensor and improve the optical characteristics, such as transmittance.

Since the touch sensor is included in the encapsulation layer 280, it is possible to prevent moisture and/or oxygen from penetrating to the touch sensor, and thus, improve the moisture-proofing of the display device. Further, defects in the touch sensor due to corrosion of the metal can be decreased and the bending durability of the flexible display device can be improved.

The touch electrodes included in the touch sensor are formed in the same layer, so that it is possible to decrease deformation of the touch sensor and prevent defects of the touch sensor when the display panel 300 is bent. It is also possible to decrease the thickness of the touch detecting layer 400 and decrease the bending curvature radius of the display device.

A reflection prevention layer 390 capable of decreasing reflection of ambient light may be further formed on the encapsulation layer 280.

Next, the flexible display device according to an exemplary embodiment will be described with reference to FIG. 7 together with the aforementioned FIGS. 1 to 6.

Figure 7:
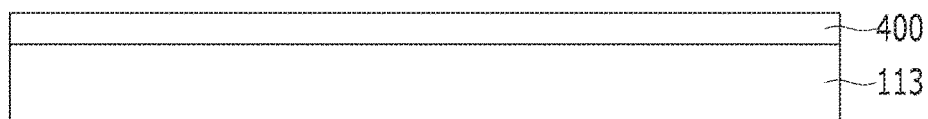
FIG. 7 is a cross-sectional view of a base film and a touch detecting layer of the flexible display device according to an exemplary embodiment.
Figure 7:
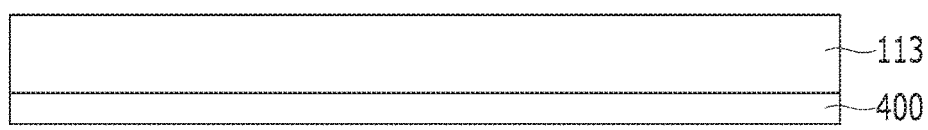

FIG. 7 is a cross-sectional view of a base film and a touch detecting layer of the flexible display device according to an exemplary embodiment.

Referring to FIG. 7, the flexible display device is substantially the same as the aforementioned flexible display device illustrated in FIGS. 1 to 6 except for the position of the touch detecting layer 400. The touch detecting layer 400 according to the FIG. 7 embodiment is formed on an upper surface of a second film 113 that is a flexible substrate as illustrated in FIG. 7A or is formed on a lower surface of the second film 113 as illustrated in FIG. 7B. That is, a plurality of touch electrodes 410 and 420 forming a touch sensor and touch wires 411 and 421 connected to the touch electrodes 410 and 420 are formed on or under the second film 113.

According to some embodiments, the flexible display device is a bottom emission type which emits light from an emission member 370 in a downward direction and displays an image. In these embodiments, a first film 112 and a barrier layer 111 have high transparency.

The effects of the embodiment of FIG. 7 are substantially the same as those of the aforementioned exemplary embodiment.

Next, a method of manufacturing the touch detecting layer 400 of the flexible display device according to an exemplary embodiment will be described with reference to FIGS. 8 to 12B together with the aforementioned drawings.

Figure 8:
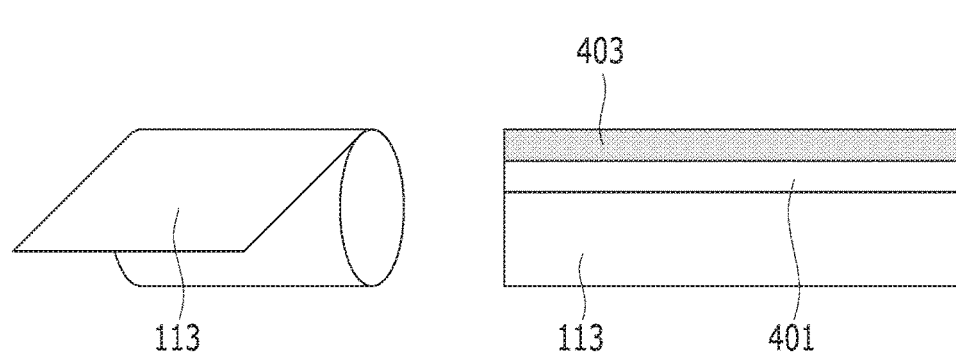
FIGS. 8 to 12B are drawings sequentially illustrating a manufacturing process of forming the touch sensor on or under the base film of the flexible display device according to an exemplary embodiment.

First, referring to FIG. 8, a conductive material is stacked on the second film 113, such as PET, by a method, such as sputtering, to form a conductive layer. The conductive layer includes a first conductive layer 401 and a second conductive layer 403 which are sequentially stacked. The first conductive layer 401 includes a transparent conductive material, such as ITO or IZO, and the second conductive layer 403 includes a metal material, such as aluminum (Al).

Figure 9A:
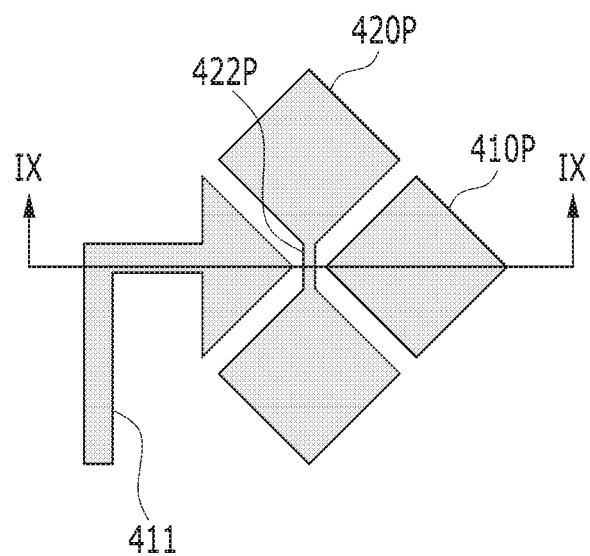
Figure 9B:
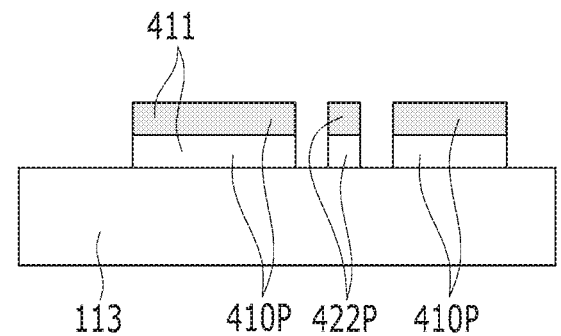

Next, referring to FIGS. 9A and 9B, a first intermediate pattern 410P, a second intermediate pattern 420P, a second connection pattern 422P, and touch wires including the first and second touch wires 411 and 421 respectively connected to the first and second intermediate patterns 410P and 420P are formed by patterning the first conductive layer 401 and the second conductive layer 403. The shape of each of the first and second intermediate patterns 410P and 420P may be the same as the aforementioned first and second touch electrodes 410 and 420.

The second intermediate patterns 420P formed in the same column are connected to each other through the second connection patterns 422P formed in the same layer as the second intermediate patterns 420P and patterned together with the second intermediate patterns 420P. In contrast, the first intermediate patterns 410P formed in the same row are connected to each other through separate first connection patterns (not illustrated).

Figure 10A:
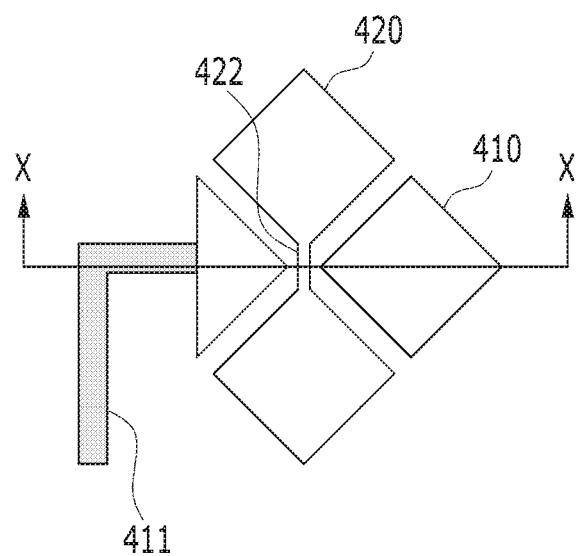
Figure 10B:
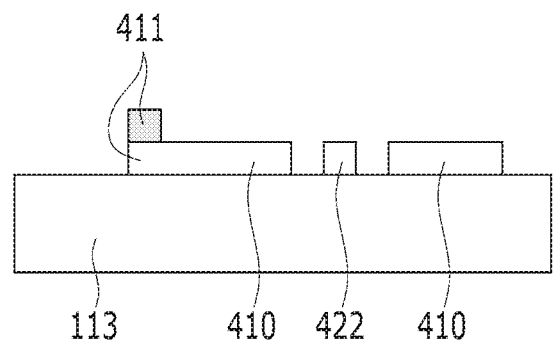

Next, referring to FIGS. 10A and 10B, a plurality of transparent touch electrodes 410, a plurality of transparent second touch electrodes 420, and a plurality of second connection parts 422 are formed by removing the second conductive layer 403, which is an upper layer of the first intermediate pattern 410P, the second intermediate pattern 420P, and the second connection pattern 422P by an etching method, or the like. In contrast, when the first touch electrodes 410 arranged in the same row are connected through the first connection parts 412 formed the same layer, the first connection parts 412 are formed instead of the second connection parts 422 in this step.

The first touch wire 411 and the second touch wire 421 may still include all of the first conductive layer 401 and the second conductive layer 403 to form low resistance wires.

Figure 11A:
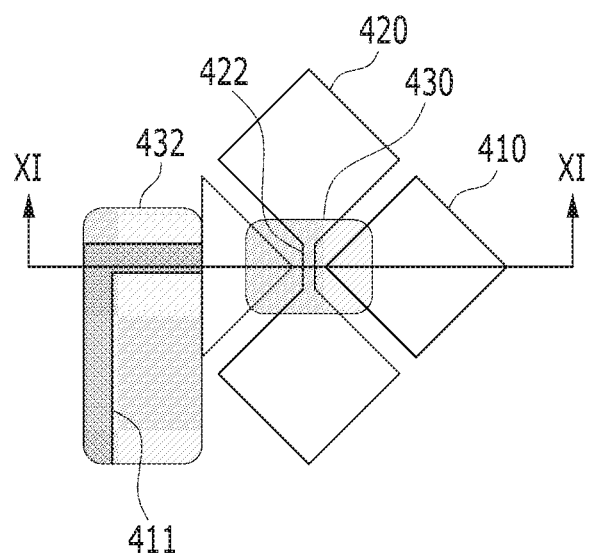
Figure 11B:
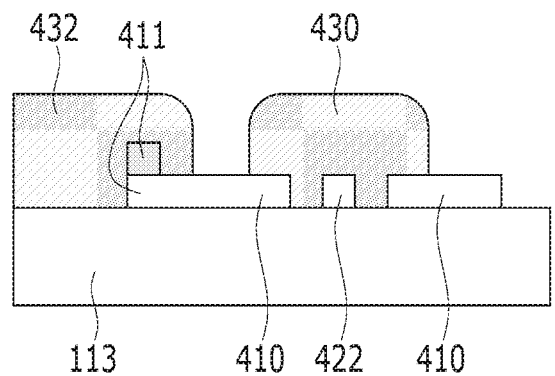

Next, referring to FIGS. 11A and 11B, an insulating layer 430 formed on the second connection part 422 and covering the second connection part 422 and an insulating layer 432 formed on the touch wire and covering the touch wire are formed by stacking an insulating material on the first touch electrode 410, the second touch electrode 420, the second connection part 422, and the touch wire and patterning the insulating material.

Figure 12A:
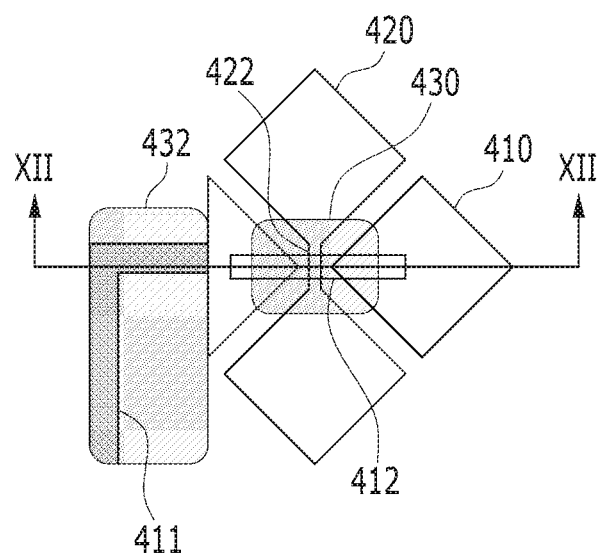
Figure 12B:
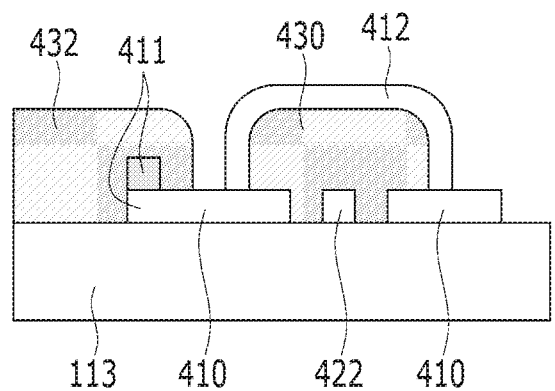

Referring to FIGS. 12A and 12B, the first connection part 412 insulated from and crossing the second connection part 422 and connecting the first touch electrodes 410, which are adjacent to each other in one row, is then formed by stacking a conductive material on the insulating layer 430 and patterning the conductive material.

Accordingly, the touch detecting layer 400 including the touch sensor is completed. The manufacturing method of the touch detecting layer 400 according to the embodiment of FIGS. 8 to 12B can be applied to an exemplary embodiment in which the touch sensor is formed on or under the second film 113 like the aforementioned exemplary embodiment illustrated in FIGS. 1 to 5, and FIG. 7.

The manufacturing method of the touch detecting layer 400 according to the embodiment of FIGS. 8 to 12B can also be applied to an embodiment in which the touch detecting layer 400 is formed inside the encapsulation layer 280 like the aforementioned exemplary embodiment illustrated in FIGS. 1 to 6. In these embodiments, the second film 113 illustrated in FIGS. 8 to 12B is replaced with any one inorganic film 280_1 of the encapsulation layer 280.

Now, various structures of the touch sensor included in the flexible display device according to exemplary embodiments will be described with reference to FIGS. 13 to 17.

Figure 13:
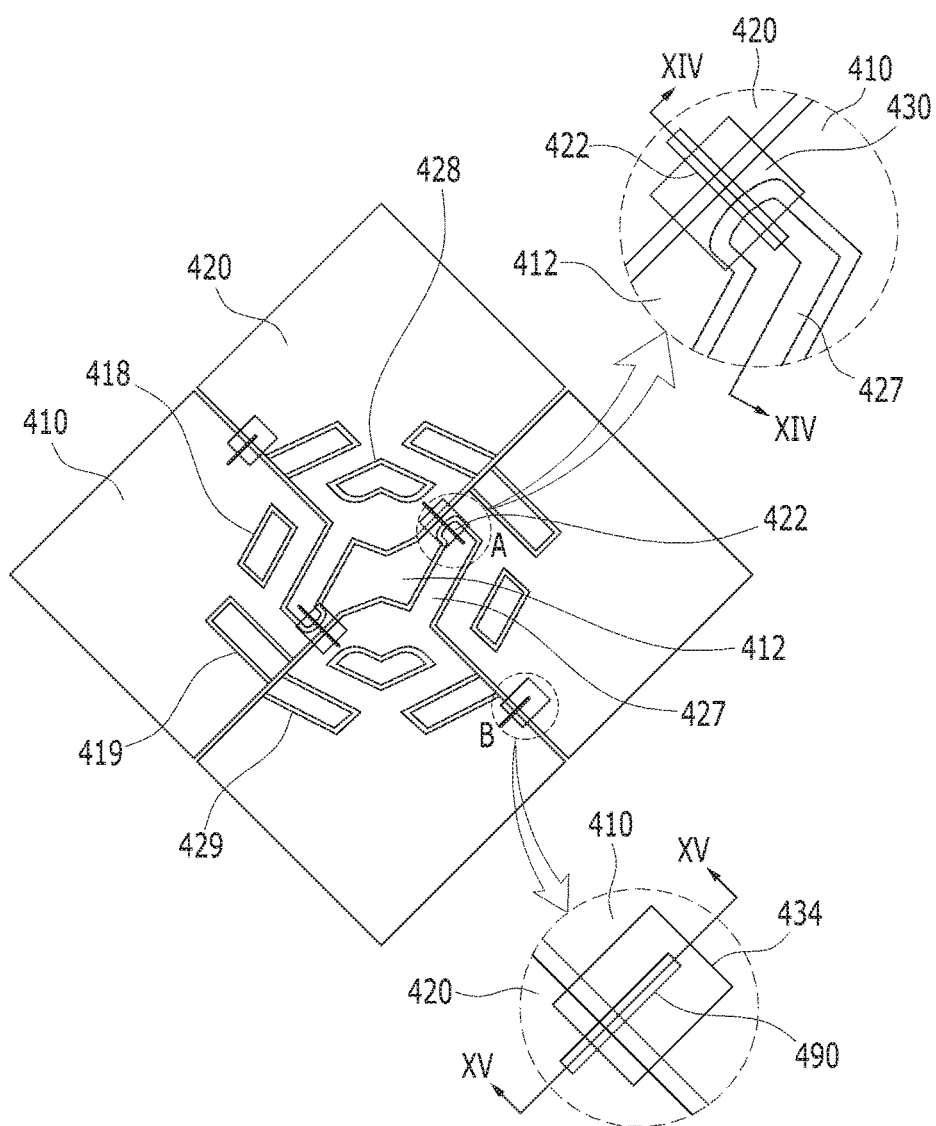
FIG. 13 is a top plan view of the touch sensor included in the flexible display device according to an exemplary embodiment.

Referring to FIG. 13, the touch sensor is substantially the same as that of the aforementioned exemplary embodiment, except it further includes a structure for protection from static electricity. The features different from those of the aforementioned exemplary embodiment illustrated in FIGS. 2 to 4 will be mainly described.

Adjacent first touch electrodes 410 formed in the same row are connected to each other by first connection parts 412 which are formed in the same layer as the first touch electrodes 410. The first connection parts 412 may be integrated with the first touch electrodes 410.

Figure 14:
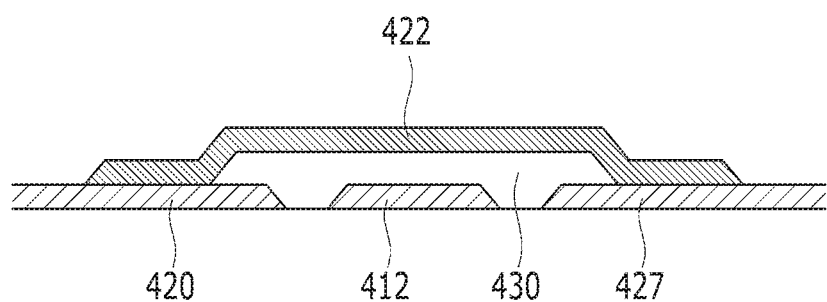
FIG. 14 is a cross-sectional view illustrating the touch sensor illustrated in FIG. 13 taken along line XIV-XIV.

First, referring to FIGS. 13 and 14, adjacent second touch electrodes 420 formed in the same column are connected to each other by second connection parts 422 which are formed on a different layer from that of the second touch electrodes 420. The second touch electrodes 420 and the second connection parts 422 are connected to each other through direct contact. There are a plurality of second connection parts 422 connecting each pair of second touch electrodes 420. FIG. 13 illustrates an example in which one pair of second connection parts 422 connects the adjacent second touch electrodes 420.

An insulating layer 430 is formed between the first and second connection parts 412 and 422 to insulate the first and second connection parts 412 and 422 from each other. The insulating layers 430 include a plurality of separate island-shaped insulators formed near the intersections between the first and second connection parts 412 and 422 as illustrated in FIG. 13. In some embodiments, the insulating layer 430 is formed over substantially the entire touch active area TA and portions of the insulating layer 430 are removed so as to expose portions of the second touch electrode 420 so that the second connection parts 422 can be connected to one pair of connected second touch electrodes 420.

The second connection parts 422 are formed of a transparent conductive material or a low resistance opaque conductive material such as metal. When the second connection parts 422 are formed of a low resistance opaque metal material, the second connection part 422 may be formed in the same layer as the touch wires 411 and 421 of the peripheral area PA and in the same manufacturing process. In order to prevent the second connection parts 422 formed of the low resistance opaque metal material from being observed, the widths of the second connection parts 422 are less than a predetermined width. Alternatively, the second connection part 422 may be designed to be inclined in an oblique direction with respect to horizontal. As described above, when the second connection parts 422 are designed to be narrow in consideration of their visibility, defects may be generated in the second connection parts 422 due to static electricity or charge build up at the intersection between the first and second connection parts 412 and 422.

In order to prevent static electricity build up, dummy patterns 418, 419, 428, and 429, each having an island shape, are electrically insulated from the touch electrodes 410 and 420 to which the dummy patterns 418, 419, 428, and 429 belong. The dummy patterns 418, 419, 428, and 429 are formed to be adjacent to the intersections between the first and second touch electrodes 410 and 420 and are formed in partial regions of at least one of the first and second touch electrodes 410 and 420. As illustrated in FIG. 13, the first dummy pattern 418 is spaced apart from an edge of the first touch electrode 410 and the second dummy pattern 419 contacts the edge of the first touch electrode 410 and is formed in a partial region of the first touch electrode 410. Similarly, the first dummy pattern 428 is spaced apart from an edge of the second touch electrode 420 and the second dummy pattern 429 contacts the edge of the second touch electrode 420 and is formed in a partial region of the second touch electrode 420.

The dummy patterns 418, 419, 428, 429 form blocking regions (insulating regions) in the current flow path of the first touch electrode 410 or the second touch electrode 420 to decrease the width of the current flow path and increase the length of the path. Thus, it is possible to prevent static electricity from rapidly flowing into a high resistance region, i.e. the crossing region between the first and second touch electrodes 410 and 420, by increasing the electrical resistance on the current flow path.

Referring to FIG. 13, the dummy patterns 418 and 428 are spaced apart from the edges of the touch electrodes 410 and 420 to which the dummy patterns 418 and 428 belong. The dummy patterns 419 and 429 contact the edges of the touch electrodes 410 and 420 to which the dummy patterns 419 and 429 belong. When positively charged static electricity collects in the dummy patterns 418 and 428, negative charge collects on surfaces of the dummy patterns 418 and 428 to pull the positive charges of the static electricity. Thus, the effects of the static electricity flowing into the second connection part 422 can be relieved. The dummy patterns 419 and 429 extend the current flow path and make the lengthens the flow of current so as to prevent the inflow current from rapidly flowing into the crossing region of the first and second touch electrodes 410 and 420.

The dummy patterns 418, 419, 428, 429 are formed in the same layers as the first and second touch electrodes 410 and 420 and are formed of the same material as the first and second touch electrodes 410 and 420.

The dummy patterns 418, 419, 428, 429 may be formed with the same size and shape, which are symmetrical to each other with respect to the row and column directions of the first and second touch electrodes 410 and 420. For example, the first and second dummy patterns 418 and 419 of the first touch electrode 410 are formed with the same size and are symmetrical to each other based on the first connection part 412. The first and second dummy patterns 428 and 429 of the second touch electrode 420 are formed with the same size and are symmetrical to each other based on the second connection part 422.

The dummy patterns 418, 419, 428, and 429 may have a bent shape so as to form a current flow path within the touch electrodes 410 and 420. For example, in the second touch electrode 420, the second dummy patterns 429 may be positioned at edges of both sides of the second touch electrode 420 and the first dummy pattern 428 having a substantially L or reverse L-shape may be positioned between the second dummy patterns 429.

The shapes and positions of the dummy patterns 418, 419, 428, 429 are not limited to those illustrated in the figures and may be variously changed.

The second touch electrode 420 has a protruding pattern 420 protruding toward the adjacent first touch electrode 410 and connected to the second connection part 422. The protruding pattern 427 prevents static electricity from rapidly flowing into the second connection part 422 which has a relatively very small width and has a shape limiting the current flow paths of the touch electrodes 410 and 420 together with the dummy patterns 418, 419, 428, and 429. A plurality of protruding patterns 427 are formed in one second touch electrode 420 and extend in parallel in opposite directions from the second touch electrodes 420 the protruding patterns 427 are connected to.

FIG. 13 illustrates an example in which the protruding patterns 427 protrude from the second touch electrodes 420, which are separated from each other and are connected to the second connection parts 422. In other embodiments, the adjacent first touch electrodes 410 are connected to each other through the first connection part 412 formed in a different layer from the first touch electrodes 410, and in these embodiments, the first touch electrodes 410 have a protruding pattern (not illustrated) connected to the first connection parts 412.

Figure 15:
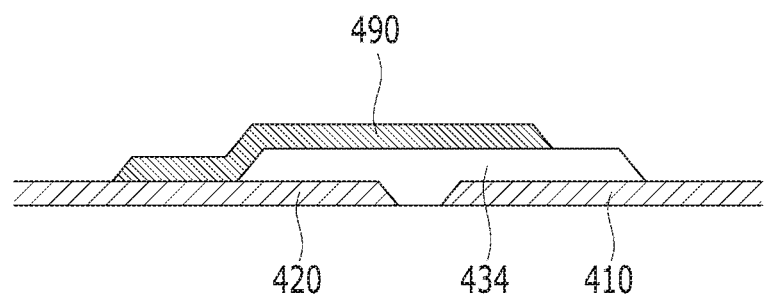
FIG. 15 is a cross-sectional view illustrating the touch sensor illustrated in FIG. 13 taken along line XV-XV.

Referring to FIGS. 13 and 15, the touch sensor further includes a plurality of static electricity inducing patterns or charge collection patterns 490. The static electricity inducing patterns 490 are electrically connected to any one of the first and second touch electrodes 410 and 420 and extend in a direction toward the touch electrode 410 or 420 adjacent to the one touch electrode 410 or 420 to which the static electricity inducing pattern 490 is connected. Thus, a partial region of the static electricity inducing patterns 490 substantially overlaps the adjacent touch electrode 410 or 420. The static electricity inducing patterns 490 are connected to any one of the touch electrodes 410 and 420 through direct contact. In other embodiments, the static electricity inducing patterns 490 are electrically connected to the touch electrode 410 or 420 through a contact hole (not illustrated) formed in an insulating layer 434 and are formed on an upper or lower layer of the touch electrode 410 or 420 connected to the static electricity inducing patterns 490.

Here, the insulating layer 434 is interposed between the touch electrode 410 or 420 not electrically connected to the static electricity inducing patterns 490 and overlap the static electricity inducing patterns 490.

The static electricity inducing patterns 490 are formed of the same material and in the same layer as the second connection parts 422 for simplification of manufacturing. In some embodiments, the static electricity inducing pattern 490 is formed of a low resistance opaque metal material like the touch wires 411 and 421.

When static electricity is induced in the static electricity inducing pattern 490, it is possible to secure stability for the first and second connection parts 412 and 422, and even when the static electricity inducing patterns 490 incur damage, the damage to the patterns does not exert an influence on the driving of the touch sensor.

Figure 16:
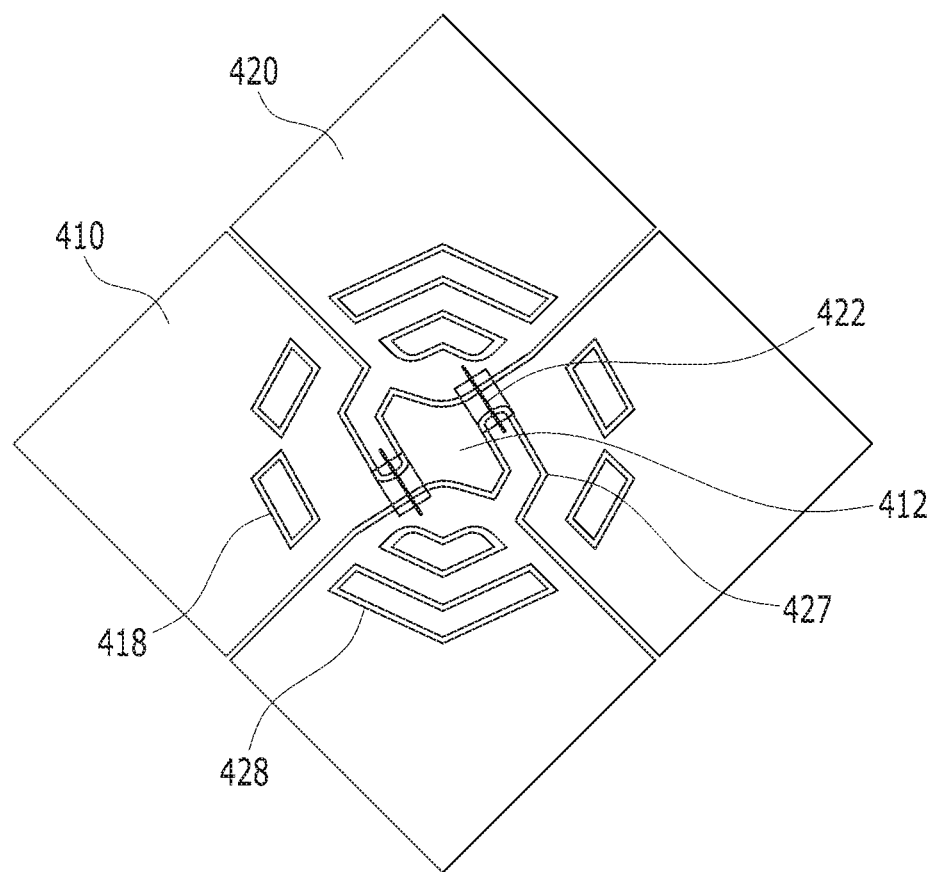
FIGS. 16 and 17 are top plan views of the touch sensor included in the flexible display device according to exemplary embodiments.

Next, referring to FIG. 16, a touch sensor according to another embodiment includes only first dummy patterns 418 and 428 and protruding patterns 427 without the aforementioned second dummy patterns 419 and 429 and static electricity inducing pattern 490 of the touch sensor illustrated in FIGS. 13 to 15.

The first touch electrodes 410 include the first dummy patterns 418 and the second touch electrodes 420 include the first dummy patterns 428 and the protruding patterns 427. The first dummy patterns 428 and the protruding patterns 427 have a substantially L or reverse L-shape.

The bent protruding pattern 427 increases the length of the current flow path between the second touch electrodes 420.

Figure 17:
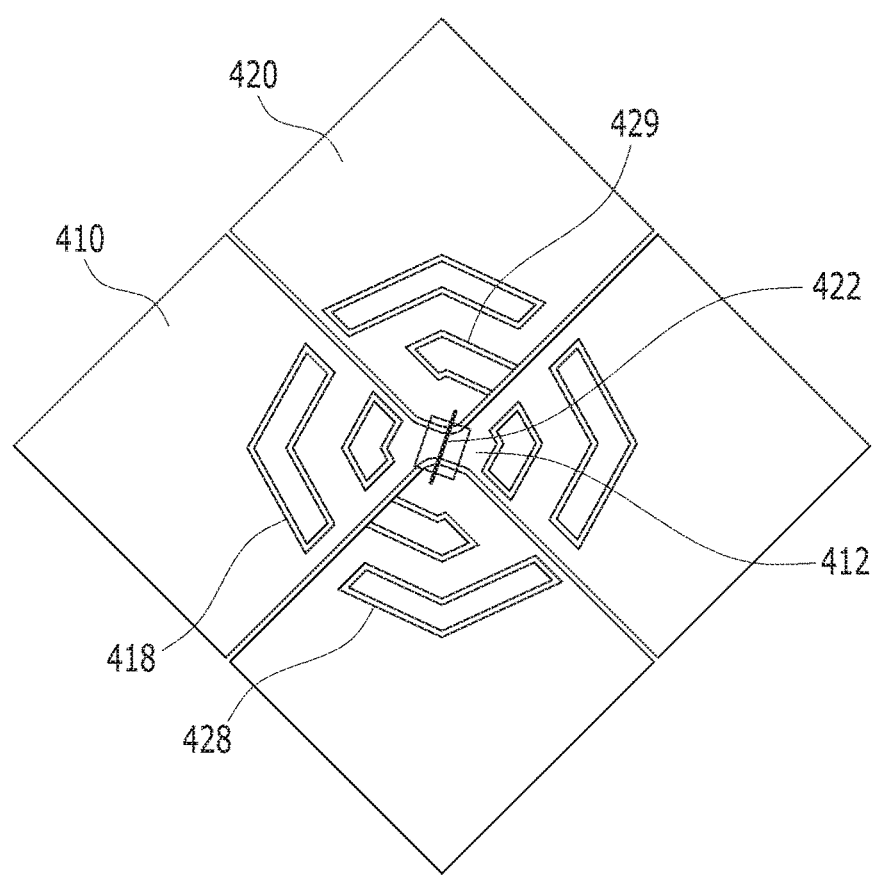

Referring to FIG. 17, a touch sensor according to another embodiment includes only first dummy patterns 418 and 428 and second dummy patterns 429 without the aforementioned protruding patterns 427 and static electricity inducing pattern 490 of the touch sensor illustrated in FIGS. 13 to 15.

The first touch electrodes 410 include the first dummy patterns 418 and the second touch electrodes 420 are electrically connected by a single second connection part 422 without a protruding pattern and include the first dummy patterns 428 and the second dummy patterns 429. The first and second connection parts 412 and 422 are oblique in a diagonal direction.

The number, shapes, and positions of the various dummy patterns, the protruding patterns, and the static electricity inducing patterns may be various combined, and variously modified if necessary.

Next, a flexible display device according to an exemplary embodiment will be described with reference to FIGS. 18 and 19.

Figure 18:
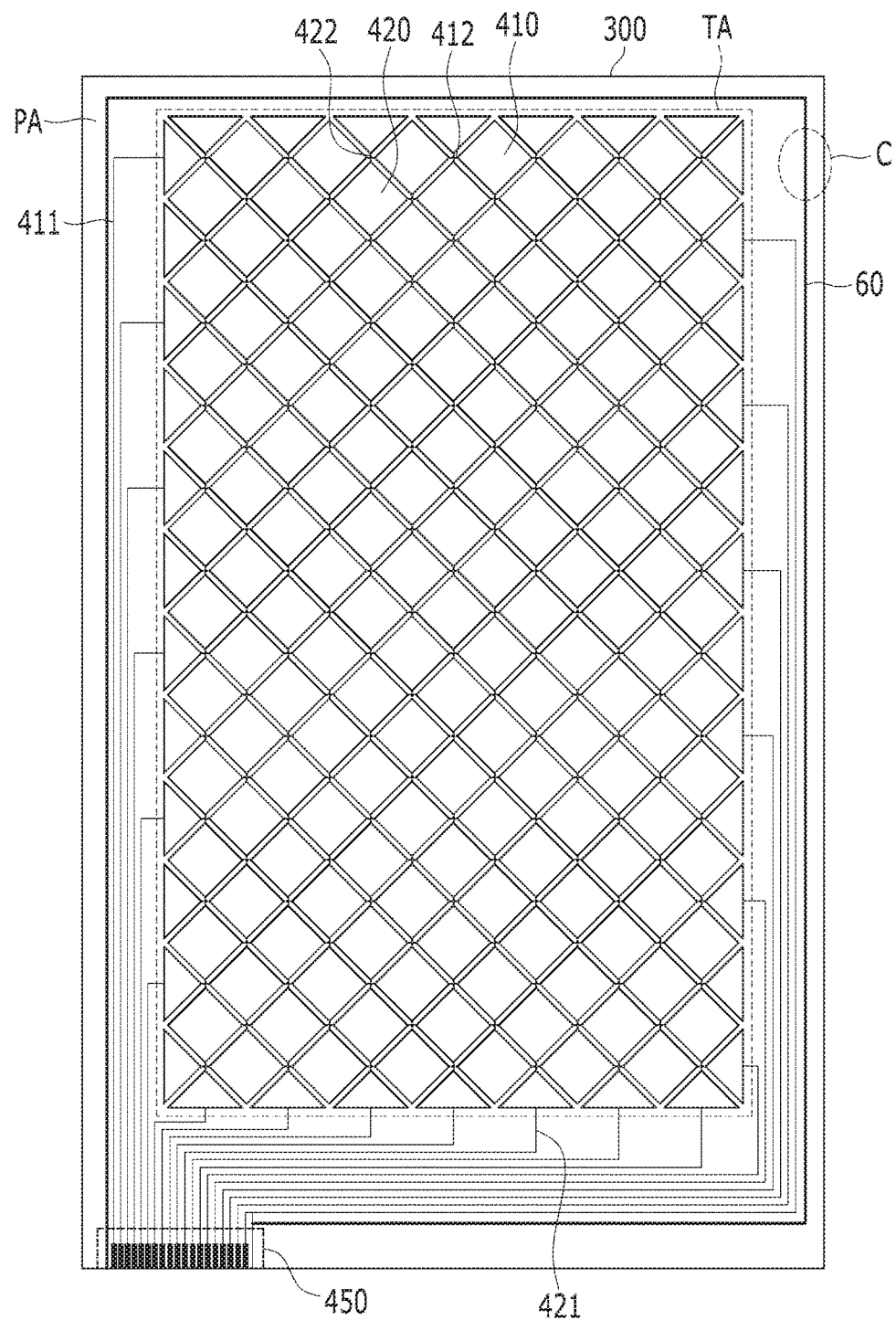
FIG. 18 is a top plan view illustrating a touch sensor and a ground wire of a flexible display device according to an exemplary embodiment.

FIG. 18 is a top plan view illustrating a touch sensor and a ground wire of the flexible display device according to an exemplary embodiment. FIG. 19 is an enlarged view of a portion of the flexible display device illustrated in FIG. 18.

The flexible display device is the same as that of the aforementioned exemplary embodiment, expect it further includes a ground wire 60 formed in a peripheral area PA.

The ground wire 60 is formed in outer peripheral areas of touch wires 411 and 421. The ground wire 60 is formed along the border of the display panel 300 surrounding the touch wires 411 and 421. For example, the ground wire 60 may have a substantially quadrangular shape.

The ground wire 60 is electrically connected to a ground power source in order to remove static electricity flowing-in to the touch active area TA from the environment. To this end, the ground wire 60 is electrically connected to the ground power source through a pad included in a pad portion 450.

Figure 19:
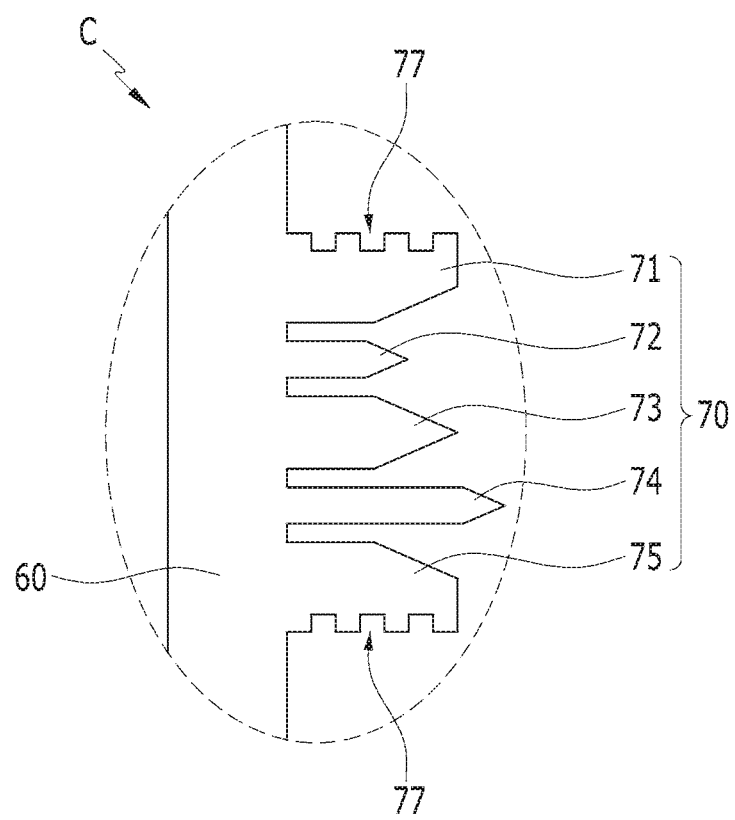
FIG. 19 is an enlarged view of a part of the flexible display device illustrated in FIG. 18.

Referring to FIG. 19, the ground wire 60 includes at least one static electricity inducing part 70. The static electricity inducing part 70 may be more densely formed in corner areas than non-corner areas of the ground wire 60.

The static electricity inducing part 70 includes a plurality of static electricity inducing patterns 71, 72, 73, 74, and 75. The static electricity inducing patterns 71, 72, 73, 74, and 75 have shapes protruding from the ground wire 60 and extend toward the outside from the ground wire 60 in order to induce static electricity flowing-in from the environment.

The static electricity inducing patterns 71, 72, 73, 74, and 75 have a lightning rod shape in order to induce external static electricity. Further, in order to improve the static electricity inducing effect, concave-convex portions 77 can be formed in at least one of the static electricity inducing patterns 71, 72, 73, 74, and 75. In some embodiments, the concave-convex portions 77 having concave-convex shapes are formed in the static electricity inducing patterns 71 and 75. The number of static electricity inducing patterns 71, 72, 73, 74, and 75 illustrated in FIG. 19 can be variously changed. Further, lengths of the static electricity inducing patterns 71, 72, 73, 74, and 75 may be different from or the same as each other.

The static electricity inducing patterns 71, 72, 73, 74, and 75 are integrally formed with the ground wire 60.

While the described technology has been described in connection with what is presently considered to be practical exemplary embodiments, it is to be understood that the described technology is not limited to the disclosed embodiments, but, on the contrary, is intended to cover various modifications and equivalent arrangements included within the spirit and scope of the appended claims.

What is claims is:

1. A display device, comprising:
a substrate;
a plurality of first touch electrodes disposed on the substrate and arranged in a first direction;
a plurality of second touch electrodes disposed on the substrate and arranged in a second direction crossing the first direction; and
a first dummy pattern, which is disposed inside a first touch electrode of the plurality of first touch electrodes, separated from an outer edge of the first touch electrode, insulated from the first touch electrode, and has an island shape,
wherein:
the first dummy pattern has an edge curved at a first axis that is parallel to the first direction and passes a center of the first touch electrode such that the first dummy pattern is symmetrical with respect to the first axis.

2. The display device of claim 1, further comprising a second dummy pattern, which is disposed inside another first touch electrode of the plurality of first touch electrodes adjacent to the first touch electrode, separated from an outer edge of the another first touch electrode, insulated from the another first touch electrode, and has an island shape,
wherein the second dummy pattern has a same shape as the first dummy pattern.

3. The display device of claim 2, wherein the first dummy pattern and the second dummy pattern are symmetrical to each other with respect to a second axis parallel to the second direction.

4. The display device of claim 1, further comprising a third dummy pattern, which is disposed outside the first touch electrode, adjacent to the outer edge of the first touch electrode, insulated from the first touch electrode, and has an island shape,
wherein the third dummy pattern extends in a straight form.

5. The display device of claim 4, further comprising a fourth dummy pattern, which is disposed outside a second touch electrode of the plurality of second touch electrodes, adjacent to an outer edge of the second touch electrode, insulated from the second touch electrode, and has an island shape,
wherein:
the fourth dummy pattern extends in a straight form; and
an edge of the third dummy pattern and an edge of the fourth dummy pattern face each other.

6. The display device of claim 4, further comprising a fourth dummy pattern, which is disposed outside another first touch electrode of the plurality of first touch electrodes, adjacent to an outer edge of the another first touch electrode, insulated from the another first touch electrode, and has an island shape,
Wherein:
the fourth dummy pattern has a same shape as the third dummy pattern; and
the third dummy pattern and the fourth dummy pattern are symmetrical to each other.

7. A display device, comprising:
a substrate;
a plurality of first touch electrodes disposed on the substrate and arranged in a first direction;
a plurality of second touch electrodes disposed on the substrate and arranged in a second direction crossing the first direction;
a first dummy pattern, which is disposed inside a first touch electrode of the plurality of first touch electrodes, separated from an outer edge of the first touch electrode, insulated from the first touch electrode, and has an island shape; and
a second dummy pattern, which is disposed outside the first touch electrode, adjacent to the outer edge of the first touch electrode, insulated from the first touch electrode, and has an island shape,
wherein the first dummy pattern has an edge curved at a first axis that is parallel to the first direction and passes a center of the first touch electrode such that the first dummy pattern is symmetrical with respect to the first axis.

8. The display device of claim 7, further comprising a third dummy pattern, which is disposed inside another first touch electrode of the plurality of first touch electrodes adjacent to the first touch electrode, separated from an outer edge of the another first touch electrode, insulated from the another first touch electrode, and has an island shape,
wherein the third dummy pattern has a same shape as the first dummy pattern.

9. The display device of claim 8, wherein the first dummy pattern and the third dummy pattern are symmetrical to each other with respect to a second axis parallel to the second direction.

10. The display device of claim 7, wherein the second dummy pattern extends in a straight form.

11. The display device of claim 10, further comprising a fourth dummy pattern, which is disposed outside a second touch electrode of the plurality of second touch electrodes, adjacent to an outer edge of the second touch electrode, insulated from the second touch electrode, and has an island shape,
wherein:
the fourth dummy pattern extends in a straight form; and
an edge of the second dummy pattern and an edge of the fourth dummy pattern face each other.

12. The display device of claim 10, further comprising a fourth dummy pattern, which is disposed outside another first touch electrode of the plurality of first touch electrodes, adjacent to an outer edge of the another first touch electrode, insulated from the another first touch electrode, and has an island shape,
wherein:
the fourth dummy pattern has a same shape as the second dummy pattern; and
the second dummy pattern and the fourth dummy pattern are symmetrical to each other.

* * * * *